(No Model.)
T. W. PORTER.
Spring Saddle Clip.
No. 235,807. Patented Dec. 21, 1880.
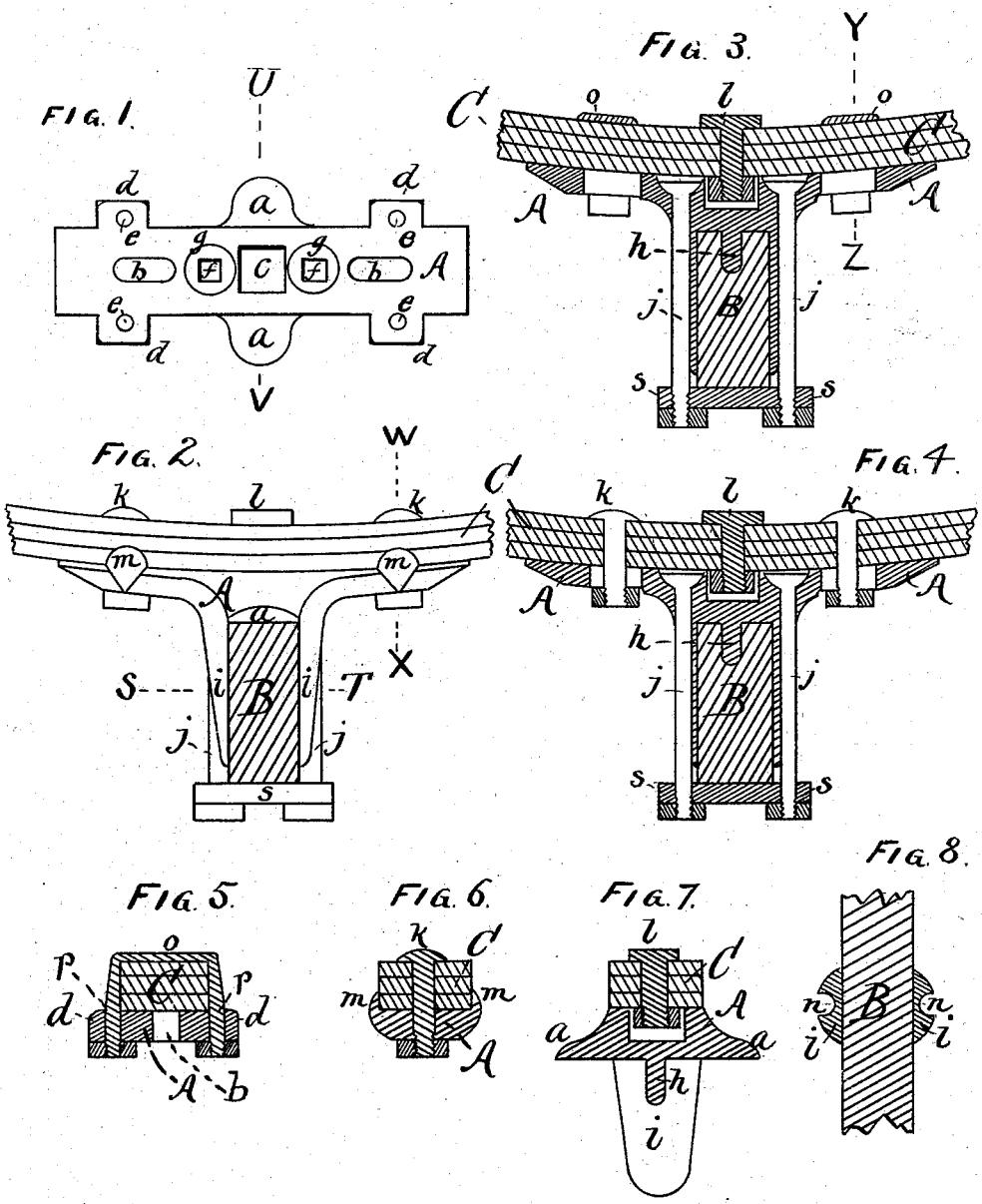
WITNESSES:
Samuel D. Kelley
H. A. Daniels
INVENTOR:
Thomas W. Porter

UNITED STATES PATENT OFFICE.

THOMAS W. PORTER, OF CHELSEA, MASSACHUSETTS.

SPRING-SADDLE CLIP.

SPECIFICATION forming part of Letters Patent No. 235,807, dated December 21, 1880.

Application filed May 17, 1880. (No model.)

*To all whom it may concern:*

Be it known that I, T. W. PORTER, of the city of Chelsea, State of Massachusetts, have invented Improvements in Spring-Saddles, of which the following is a specification.

The object of my invention is to effect certain improvements in cast-metal saddles which are interposed between the springs of vehicles and the axle; and the invention consists in several improvements in the details of such saddles, which will be hereinafter, in connection with the accompanying drawings, fully described and explained, and specified in the claims.

Figure 1 is a top or plan view of my saddle so formed that the spring may be secured thereto by bolts or clips. Fig. 2 is a side elevation of the saddle so formed as to secure the spring thereto by bolts, the central portion of the spring being shown in elevation and the axle in vertical transverse section. Fig. 3 is a vertical section taken transversely to the axle and longitudinally through the saddle and central portion of the springs, the spring and saddle being shown as secured together by clips. Fig. 4 is a section like Fig. 3, except that the spring is shown as secured to the saddle by bolts instead of clips. Fig. 5 is a transverse vertical section as taken on line Y Z, Fig. 3. Fig. 6 is a similar section as taken on line W X, Fig. 2. Fig. 7 is a similar section as taken on line U V, Fig. 1. Fig. 8 is a horizontal section taken on line S T, Fig. 2.

In these figures, A is the bed or body of the saddle, B is the axle to which the saddle is attached, and C the spring which is secured to the saddle. *a a*, Figs. 1, 2, 7, are ears formed upon each side of body A of the saddle, and which furnish a bearing upon the axle, extending beyond the side lines of the body A. *b b* are elongated holes formed in body A to receive bolts *k k*, which secure spring C to the saddle. *d d* are perforated lugs or clip-ears formed upon body A to receive, in the holes *e*, the round ends *p* of clips *o*, which may be employed, instead of bolts *k*, to secure the spring to the saddle.

Either the holes *b* or the ears *d*, or both, may be formed in the act of casting the saddle, and when the spring is secured in place by the clips *o* the holes *b* are nugatory; but when the spring is secured by bolts *k* the ears *d* are cut off. The advantage of forming the saddle with both the holes and ears is, that dealers remote from sources of supply can, so long as they have any of the saddles on hand, supply those who wish to attach the springs in either manner.

Holes *b* are elongated to adapt the saddles to springs having the holes for bolts *k* at varying distances from the center, as there is no established distance apart for drilling such holes by the various spring-manufactories; but when the holes in the saddle are thus elongated springs of all the various makers can be used.

*c* is a square central recess in the saddle. It is of such size and depth as to receive the nut or head of the central spring-bolt, *l*, which thereby prevents end movement of the springs when the carriage is in use.

*h* is a pin formed centrally upon the under side of the saddle, and to enter a hole in the axle, thereby preventing the saddle from displacement upon the axle. Instead of such central pin, there may be two, one under each of the ears *a*.

The holes *f f* are formed square in bed A, and are continued downward, merging in the curved grooves *n*, Fig. 8, which are formed in the vertical lugs *i i*, which inclose axle B.

The countersinks *g g*, which surround holes *f*, receive the corresponding heads of bolts *j*, Figs. 3, 4, and the lower rounded portion of the bolts is seated in the grooves in lugs *i*. (See 2, 3, 4, 8.) The square portions of bolts *j*, fitting square holes *f* in bed A, prevents the bolts from turning when the screw-nuts thereon are turned up against yoke *s*, which secures the saddle to the axle. By thus forming the lugs *i* with a vertical groove coincident with holes *f* and to receive bolts *j*, instead of forming such lugs with a bulk or thickness to receive the said bolts in a tubular passage formed within the said lugs, a material reduction in weight is effected, as also the saving of the additional cost thereof, besides the more important fact that the style and appearance of the shackle is thereby materially changed and improved, giving to said lugs and bolts, when in position and painted, an appearance not distinguishable except by close scrutiny from the well-known style of clip termed the "ribbed clip," thus bringing the saddle within the well-understood, but not easily-defined, limits of what is termed "carriage-iron style."

$m\ m$ are flanges formed upon each edge of bed A, as shown in Figs. 2, 6, to hold spring C in line with bed A, when, instead of clips $o$, the bolts $k$ are employed to secure the spring to the saddle, it being much more difficult to adjust the spring centrally to the saddle by such bolts passing through both than by the clips which inclose the spring and enter the holes $e$ in bed A, outside the spring.

I am aware that wrought-iron saddles have been forged with the lugs $i$ formed upon bed A, and terminating at their lower end in a round threaded part or tail, like a clip, to receive yoke $s$ and the screw-nuts which secured the saddle in place; and I am also aware that cast-metal saddles have long been made with a bed, A, having a central recess, $c$, and the depending lugs $i$ to inclose the axle, but not provided with grooves $n$; and I make no claim to a wrought-iron saddle, nor to a cast-metal saddle, when formed simply as just described, my invention consisting in a cast-metal saddle embodying the several peculiarities specified in the following claims, to wit:

1. A spring-saddle formed with the centrally-arranged elongated bolt-holes $b\ b$ and the ears $d\ d$, for the reception of clips $o$, substantially as specified.

2. A spring-saddle formed with body A, lugs $d$, ears $a$, grooved lugs $i$, and pin $h$, all substantially as specified.

3. A spring-saddle having the grooved lugs $i$ and the coinciding holes $f$, to receive bolts $j$, substantially as specified.

THOMAS W. PORTER.

Witnesses:
 THEO. MUNGEN,
 WILLIAM PAXTON.